United States Patent
Ukai

(10) Patent No.: US 11,355,099 B2
(45) Date of Patent: Jun. 7, 2022

(54) WORD EXTRACTION DEVICE, RELATED CONFERENCE EXTRACTION SYSTEM, AND WORD EXTRACTION METHOD

(71) Applicant: YAMAHA CORPORATION, Hamamatsu (JP)

(72) Inventor: Satoshi Ukai, Waltham, MA (US)

(73) Assignee: YAMAHA CORPORATION, Hamamatsu (JP)

( * ) Notice: Subject to any disclaimer, the term of this patent is extended or adjusted under 35 U.S.C. 154(b) by 72 days.

(21) Appl. No.: 16/573,142

(22) Filed: Sep. 17, 2019

(65) Prior Publication Data

US 2020/0013389 A1 Jan. 9, 2020

Related U.S. Application Data

(63) Continuation of application No. PCT/JP2017/011995, filed on Mar. 24, 2017.

(51) Int. Cl.
*G10L 15/02* (2006.01)
*G10L 15/26* (2006.01)
(Continued)

(52) U.S. Cl.
CPC .............. *G10L 15/02* (2013.01); *G06F 40/10* (2020.01); *G06F 40/216* (2020.01); *G10L 15/26* (2013.01)

(58) Field of Classification Search
CPC ......... G10L 15/26; G10L 15/02; G06F 40/20; G06F 40/268; G06F 17/21; G06F 17/2715; G06F 40/10; G06F 40/216
See application file for complete search history.

(56) References Cited

U.S. PATENT DOCUMENTS 8,375,022 B2 * 2/2013 Balinsky ............... G06F 16/334
707/713
8,589,159 B2 11/2013 Morisaki
(Continued)

FOREIGN PATENT DOCUMENTS

JP 2011100355 A 5/2011
JP 2011227805 A 11/2011
(Continued)

OTHER PUBLICATIONS

Office Action issued in Japanese Appln. No. 2019-506885 dated Apr. 21, 2020. English translation provided.
English translation of Written Opinion issued in Intl. Appln. No. PCT/JP2017/011995 dated Jun. 6, 2017, previously cited in IDS filed Sep. 17, 2019.
(Continued)

*Primary Examiner* — Angela A Armstrong
(74) *Attorney, Agent, or Firm* — Rossi, Kimms & McDowell LLP

(57) ABSTRACT

A word extraction method according to at least one embodiment of the present disclosure includes: converting, with at least one processor operating with a memory device in a device, received speech information into text data; converting the text data into a string of words including a plurality of words; extracting, with the at least one processor operating with the memory device in the device, a keyword included in a keyword database from the plurality of words; and calculating, with the at least one processor operating with the memory device in the device, importance levels of the plurality of words based on timing of utterance of the keyword and timing of utterance of each of the plurality of words.

21 Claims, 11 Drawing Sheets

(51) Int. Cl.
*G06F 40/10* (2020.01)
*G06F 40/216* (2020.01)

(56) References Cited

U.S. PATENT DOCUMENTS

| | | | |
|---|---|---|---|
| 2009/0150155 A1* | 6/2009 | Endo | G10L 15/04 704/255 |
| 2011/0082690 A1* | 4/2011 | Togami | H04R 3/005 704/201 |
| 2011/0112835 A1 | 5/2011 | Shinnishi | |
| 2015/0106091 A1* | 4/2015 | Wetjen | H04M 3/568 704/235 |
| 2015/0348538 A1* | 12/2015 | Donaldson | G10L 17/22 704/235 |
| 2016/0357749 A1* | 12/2016 | Fan | G06Q 10/10 |
| 2017/0060828 A1* | 3/2017 | Rainisto | H04L 12/1831 |

FOREIGN PATENT DOCUMENTS

| | | |
|---|---|---|
| JP | 2011248409 A | 12/2011 |
| JP | 2013109635 A | 6/2013 |
| JP | 2014229075 A | 12/2014 |
| JP | 2016091487 A | 5/2016 |
| WO | 2017038794 A1 | 3/2017 |

OTHER PUBLICATIONS

International Preliminary Report on Patentability issued in Intl. Appln. No. PCT/JP2017/011995 dated Oct. 3, 2019 English translation provided.

International Search Report issued in Intl. Appln. No PCT/JP2017/011995 dated Jun. 6, 2017. English translation provided.

Written Opinion issued in Intl. Appln. No. PCT/JP2017/011995 dated Jun. 6, 2017.

\* cited by examiner

FIG.4

| APPROVING WORD UTTERER | WEIGHTING COEFFICIENT |
|---|---|
| 1 user | 1.5 |
| 2 users | 1.7 |
| 3 users | 1.9 |
| 4 users | 2.1 |
| 5 users | 2.3 |
| 6 users | 2.5 (3.5) |
| INCLUDING SIXTH USER | +1.0 |

FIG.7

| | KEYWORD C<br>KEYWORD F   KEYWORD G<br>MICROPHONE<br>KEYWORD E   KEYWORD A<br>KEYWORD H<br>FLAT CABLE<br>KEYWORD B KEYWORD D | |
|---|---|
| CONFERENCE NAME : CODEC BRAIN-STORMING<br>ORGANIZER : YAMADA<br>CONFERENCE ROOM : F309<br>CONFERENCE DATE/TIME : 5/2 (TUE) 10:00–11:00 | |
| CONFERENCE NAME : SETTLEMENT REPORT MEETING<br>ORGANIZER : ITO<br>CONFERENCE ROOM : F502<br>CONFERENCE DATE/TIME : 6/1 (THU) 13:00–14:00 | |

FIG.9

- FLAT CABLE
  - (FFC,100%)
  - (CARD CABLE,90%)
  - (FLAT-SHAPED CABLE,43%)
- FFC
  - (FLAT CABLE,100%)
  - (CARD CABLE,90%)
- MICROPHONE
  - (MIC,100%)
  - (SOUND RECEIVING ELEMENT,100%)

WORD EXTRACTION DEVICE, RELATED CONFERENCE EXTRACTION SYSTEM, AND WORD EXTRACTION METHOD

CROSS-REFERENCE TO RELATED APPLICATION

The present application is continuation of International Application No. PCT/JP2017/011995 filed on Mar. 24, 2017. The contents of the application are hereby incorporated by reference into this application.

BACKGROUND

1. Field

The present disclosure relates to a word extraction device, a related conference extraction system, and a word extraction method.

2. Description of the Related Art

In Japanese Patent Application Laid-open No. 2014-229075, there is disclosed a device in which speech recognition is performed on a recorded conversation to extract a frequently appearing word as an important word, and the degree of match or the like of the extracted important word is used to extract and display a highly related conference from a plurality of previously held conferences.

SUMMARY

The related-art device uses only the appearance frequency to extract an important word, which means that an important word is not always extracted.

The present invention has been made in view of the problem described above, and an object of the present invention is therefore to improve the extraction precision of a device configured to extract important word.

(1) According to at least one embodiment of the present disclosure, there is provided a word extraction device, including: at least one processor; and at least one memory device configured to store a plurality of instructions, which, when executed by the at least one processor, causes the at least one processor to operate to: convert received speech information into text data; convert the text data into a string of words including a plurality of words; extract a keyword included in a keyword database from the plurality of words, and calculate importance levels of the plurality of words based on timing of utterance of the keyword and timing of utterance of each of the plurality of words.

(2) According to at least one embodiment of the present disclosure, there is provided a related conference extraction system, including: at least one processor; and at least one memory device configured to store a plurality of instructions, which, when executed by the at least one processor, causes the at least one processor to operate to: convert received speech information into text data; convert the text data into a string of words including a plurality of words; calculate appearance frequencies of the plurality of words; extract a keyword included in a keyword database from the plurality of words, obtain word-to-be-weighted information about a word to be weighted based on timing of utterance of the keyword and timing of utterance of each of the plurality of words, and calculate importance levels of the plurality of words based on the appearance frequencies and the word-to-be-weighted information; and extract, from pieces of conference information of a plurality of past conferences included in a related conference information database, the conference information of a related conference, based on the importance levels of the plurality of words.

(3) According to at least one embodiment of the present disclosure, there is provided a word extraction method, including: converting, with at least one processor operating with a memory device in a device, received speech information into text data; converting, with the at least one processor operating with the memory device in the device, the text data into a string of words including a plurality of words; extracting, with the at least one processor operating with the memory device in the device, a keyword included in a keyword database from the plurality of words; and calculating importance levels of the plurality of words based on timing of utterance of the keyword and timing of utterance of each of the plurality of words.

BRIEF DESCRIPTION OF THE DRAWINGS

FIG. 4 is a reference table for showing a relation between an approving word utterer count and a weighting coefficient in the word extraction device according to the first embodiment.

FIG. 7 is a conceptual diagram for illustrating a scheduler including a display image in which important word generated by the word extraction device according to the first embodiment are displayed.

FIG. 9 is a conceptual diagram for illustrating a synonym database, which is included in the word extraction device according to the first embodiment.

DETAILED DESCRIPTION

First Embodiment

A first embodiment of the present invention is described below with reference to the drawings.

[Word Extraction Device 100]

Figure 1:
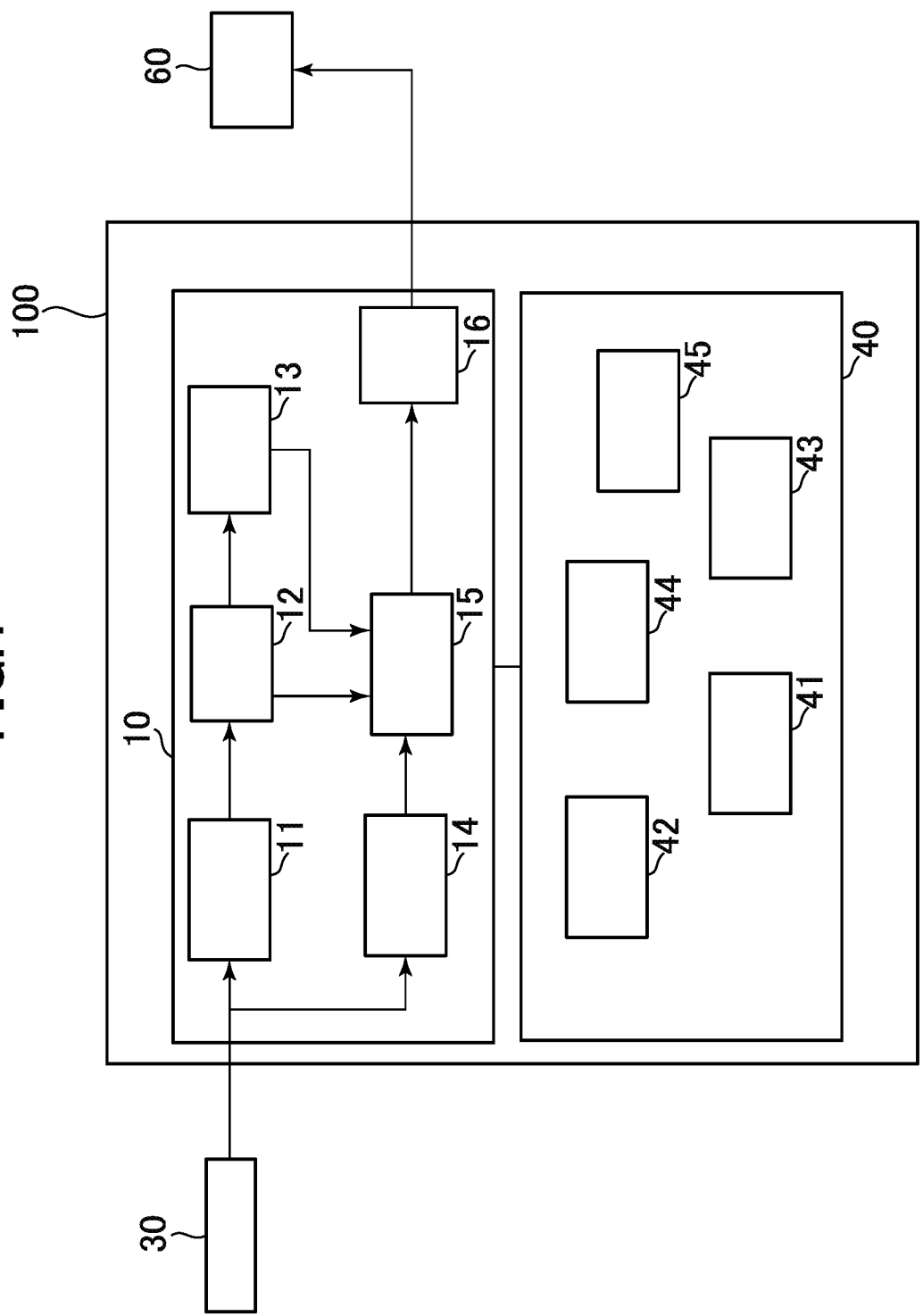
FIG. 1 is a block diagram of a word extraction device according to a first embodiment of the present disclosure.

FIG. 1 is a block diagram of a word extraction device 100 according to the first embodiment. The word extraction device 100 is a system configured to extract important word from users' utterances in, for example, a conference. The word extraction device 100 in the first embodiment includes a controller 10 and a storage 40. The controller 10 is connected to sound pickup equipment 30 and display equipment 60, which are pieces of external equipment connected to the word extraction device 100.

The connection between the word extraction device 100 and the sound pickup equipment 30 and the connection between the word extraction device 100 and the display equipment 60 may be wired connection or wireless connection. The sound pickup equipment 30 and the display equipment 60, which are provided in the first embodiment as external equipment connected to the word extraction device 100, may be provided as built-in equipment of the word extraction device 100.

The controller 10 of the word extraction device 100 is a computer configured to execute a speech recognition step S1, a morphological analysis step S2, a frequency analysis step S3, a speaker location estimation step S4, an importance level calculation step S5, and a display image generation Step S6, which are described later, as programmed by a program 42 stored in the storage 40. The program 42 may be installed from various recording media irrespective of whether it be optical, magnetic, or other types, or may be downloaded via the Internet.

[Sound Pickup Equipment 30]

The sound pickup equipment 30 is connected to the controller 10 of the word extraction device 100 by wired or wireless connection, and includes a microphone. The number of microphones included is not particularly limited. In the first embodiment, a configuration in which the sound pickup equipment 30 includes N directional microphones arranged to set the direction of the highest sensitivity of each microphone to a direction that is different by 360/N degrees is described as an example. The sound pickup equipment 30 picks up a speech uttered by a user and transmits information about the speech to the controller 10. The transmission of the speech information from the sound pickup equipment 30 to the word extraction device 100 may be direct transmission or indirect transmission via a server or the like.

[Storage 40]

The storage 40 is implemented as, for example, a hard disc drive (HDD). Various recording media including flash memories and other solid memories, memory cards with a built-in solid memory, optical discs, magneto-optical disks, and hologram memories may be employed by the storage 40, and the storage 40 is configured so that the recording and reproduction of the employed recording medium are executable.

The storage 40 stores, in addition to the program 42 used by the controller 10 for overall control of the word extraction device 100, a grammar database 41, a word class database 43, a synonym database 44, and a keyword database 45. An example in which approving words described later are stored as keywords in the keyword database 45 is described in the first embodiment.

[Controller 10]

The controller 10 includes a processor and a memory. The controller 10 also includes a speech recognizer 11, a morphological analyzer 12, a frequency analyzer 13, a speaker location estimator 14, an importance level calculator 15, and a display image generator 16. The controller 10 uses the program 42 stored in the storage 40 to control the operation of the speech recognizer 11, the morphological analyzer 12, the frequency analyzer 13, the speaker location estimator 14, the importance level calculator 15, the display image generator 16, and the storage 40.

[Speech Recognizer 11]

The speech recognizer 11 receives the speech information transmitted from the sound pickup equipment 30, and converts the speech information into text data in a text format or other formats. The speech recognizer 11 transmits the text data to the morphological analyzer 12.

[Morphological Analyzer 12]

The morphological analyzer 12 breaks the text data received from the speech recognizer 11 into a plurality of morphemes and identifies the word class and the like of each morpheme based on information stored in the grammar database 41 and the word class database 43, which are included in the storage 40. The morphological analyzer 12 uses the results of identifying the word classes of the morphemes to convert the text data into a string of words containing a plurality of words, and transmits the string of words to the frequency analyzer 13 and the importance level calculator 15.

Words in the string of words are aligned in the order of how much time has elapsed since the start of the conference, and it can accordingly be said that the string of words include time information.

[Frequency Analyzer 13]

The frequency analyzer 13 analyzes the string of words received from the morphological analyzer 12, and calculates an appearance frequency for each of the words. That is, the frequency analyzer 13 calculates, for each word, how many times the word is included in utterances of users in a conference. The frequency analyzer 13 transmits appearance frequency information of each word to the importance level calculator 15.

The frequency analyzer 13 in the first embodiment uses the synonym database 44 included in the storage 40 to identify a word uttered in a conference and the word's synonym as the same, and calculates the sum of the appearance frequency of the word and the appearance frequency of the synonym as the word's appearance frequency.

The synonym database 44 in the first embodiment contains information about synonyms of a specific word and, for example, as illustrated in FIG. 9, indicates the degree of similarity of a synonym of a specific word in percentage, from 0% to 100%. A synonym whose degree of similarity is 100% is to be identified with the specific word. Accordingly, the appearance frequency of the synonym is added to the appearance frequency of the specific word, and the sum is regarded as the appearance frequency of a specific word group. The appearance frequency of a synonym whose degree of similarity to the specific word is not 100% may be added as well in the calculation of the appearance frequency of the specific word group. Alternatively, a value that is the product of the appearance frequency of a synonym by the degree of similarity may be added in the calculation of the appearance frequency of the specific word group.

This configuration prevents a situation in which the appearance frequencies of a plurality of words used in practically the same meaning are calculated separately. The configuration consequently reduces the possibility of calculating the importance level of a word that has a plurality of synonyms low despite the word being an important word.

[Speaker Location Estimator 14]

The speaker location estimator 14 estimates, for each user, an utterance location at which the user has made an utterance based on the user's speech information received from the sound pickup equipment 30. In the first embodiment, the sound pickup equipment 30 includes N directional microphones arranged at 360/N-degree intervals as described above, and the speaker location estimator receives the speech information from the N directional microphones.

The directional microphones employed may have, for example, a configuration in which a hole or a groove is formed behind a diaphragm as a sound passageway, a speech uttered behind the diaphragm separates into an indirect sound, which enters from the hole or groove and reaches the back side of the diaphragm, and a direct sound, which reaches the front side of the diaphragm, and the indirect sound and the direct sound cancel each other to be prevented from producing an electric output.

The speaker location estimator 14 receives the speech information from the N directional microphones, records the speech information from the N directional microphones as an N-dimensional vector, and detects a volume ratio of sounds reaching the N directional microphones. The speaker location estimator 14 then performs clustering on the volume ratio for a conversation of a fixed length of time with the use of K-means or other methods, to thereby estimate the utterance location of each user, and generates location information about the estimated location. The location information includes information about the utterance location of the user who is the speaker. The location information may also include information about the number of users who are speakers. The speaker location estimator 14 transmits the generated location information to the importance level calculator 15.

The information about the user's utterance location estimated by the speaker location estimator 14 and the information about the user's utterance location that is included in the location information transmitted from the speaker location estimator 14 to the importance level calculator 15 are not required to include information indicating the specific location of the user. The information about the user's utterance location may be information just specific enough to derive information about the number of users who are speakers and to estimate which speech has been uttered by which user.

The speaker location estimator 14 in the first embodiment further adds time information to the location information, thereby enabling the importance level calculator 15, which is described later, to associate each word with the location information relevant to the word.

[Importance Level Calculator 15]

The importance level calculator 15 calculates, for each word, the importance level of the word with the use of the word's appearance frequency information transmitted from the frequency analyzer 13, approving words, which are included in the string of words transmitted from the morphological analyzer 12 and serve as keywords described later, and the location information transmitted from the speaker location estimator 14. A more specific description is given below on how the importance level is calculated for each word by the importance level calculator 15.

The importance level calculator 15 first uses the appearance frequency information received for each word from the frequency analyzer 13 to calculate the importance level of the word. A word having a higher appearance frequency is more likely to be important, and a calculation method that gives a high importance level to a word high in appearance frequency is accordingly employed. In the first embodiment, a method in which the appearance count itself of a word is calculated as the word's importance level is employed, for example.

The importance level calculator 15 subsequently extracts, from the string of words received from the morphological analyzer 12, an approving word as a keyword and an important word related to the approving word. An approving word is a word that signifies an approval of a word uttered immediately before the word of interest, for example, "wow", "good", or "aha". Words to be recognized as approving words by the importance level calculator 15 are stored in advance in the keyword database 45 of the storage 40. Keywords in the first embodiment are approving words, but words other than approving words may be stored as keywords in the keyword database 45.

When an approving word is found in the string of words transmitted from the morphological analyzer 12, the importance level calculator 15 extracts a word to be weighted, based on the timing of utterance of the approving word and the timing of utterance of each of the plurality words included in the string of words, and weights the importance level of the word to be weighted. For example, a word uttered within a predetermined period of time that immediately precedes the time of utterance of the approving word is extracted as a word to be weighted, and the importance level of the extracted word is weighted by multiplying the appearance count of the extracted word by a predetermined coefficient. In this manner, the importance level calculator 15 obtains information for identifying a word to be weighted that has been uttered a predetermined length of time prior to the time of utterance of the approving word, namely, word-to-be-weighted information, through an analysis of the string of words transmitted from the morphological analyzer 12. A method in which a word that is one of a predetermined number of words uttered before the time of utterance of the approving word is extracted as a word to be weighted may be employed.

The importance level calculator 15 in the first embodiment also calculates the number of users who have uttered the approving words described above with the use of the location information received from the speaker location estimator 14. As described above, the time information added to the location information allows the importance level calculator 15 to associate the location information with the string of words transmitted from the morphological analyzer 12. That is, the importance level calculator 15 is capable of extracting an approving word from the string of words transmitted from the morphological analyzer 12 as well as figuring out how many speakers have uttered the approving word.

The importance level calculator 15 figures out how many speakers have uttered the approving word, and calculates the importance level of a word that has been uttered a predetermined length of time prior to the time of utterance of the approving word. In the calculation, the importance level calculator 15 determines, based on the number of users who have uttered the approving word, the value of the weighting coefficient by which the appearance count of the word is to be multiplied. Specifically, the importance level calculator 15 employs a high weighting coefficient when the number of users who have uttered the approving word is large, and employs a low weighting coefficient when the number of users who have uttered the approving word is small. The weighting coefficient employed is a value larger than 1 even when the number of users who have uttered the approving word is small. The first embodiment may have a configuration in which, in the case of an approving word uttered from a specific direction, the importance level calculator 15 weights the appearance frequency more heavily in the calculation of the importance level of a word uttered a predetermined length of time prior to the time of utterance of the approving word. For instance, in the case where a person in charge of an organization sits always at a specific place, a higher weighting coefficient may be employed in the calculation of the importance level of a word that has been uttered a predetermined length of time prior to the time of utterance of an approving word from the seating place of the person in charge of the organization.

The importance level calculator 15 in the first embodiment may extract a "word high in the rate of contribution to the improvement of the conference's atmosphere" from the string of words received from the morphological analyzer 12 to further weight the extracted word. Specifically, the importance level calculator 15 calculates the appearance frequency of an approving word per unit time in the conference from the string of words received from the morphological analyzer 12. The importance level calculator 15 can then extract a point in time at which the appearance frequency of the approving word has increased, and weight the importance level of a word that has been uttered a predetermined length of time prior to the extracted time point.

After calculating the importance levels of words uttered in the conference by the method described above, the importance level calculator 15 transmits a plurality of words calculated to be high in importance level and the words' importance levels to the display image generator 16. The importance level calculator 15 may transmit a list that contains every word uttered in the conference and the importance level of the uttered word to the display image generator 16, but only a plurality words having high importance levels and the words' importance levels are desirably transmitted in order to keep the amount of data communication small.

[Display Image Generator 16]

The display image generator 16 generates a display image, which is to be displayed on the display equipment 60 to indicate important words, with the use of the plurality of words having high importance levels and received from the importance level calculator 15. A display image indicating important words is an image displayed in a predetermined display area to enumerate a plurality of words deemed as important in a conference. When generating a display image indicating important words, the display image generator 16 may make a word that is particularly important among the plurality of selected words more conspicuous by, for example, displaying the particularly important word in a large font size or in a different color.

The display image generator 16 transmits the generated display image indicating important words to the display equipment 60 to display the display image indicating important words on the display equipment 60. The display equipment 60 displays the display image indicating important words in a display area that is provided in advance beside an information field for one of the conferences in which the conference's agenda, organizer, date/time, location, and the like are written in, for example, a scheduler used for booking status checking, registration, and the like of a plurality of conferences in an organization.

The conference information field beside which the display image indicating important words is to be displayed out of conference information fields for the plurality of conferences may be determined by the controller 10. For example, the controller 10 determines which conference is currently being held from the date/time and location of the conference, login statuses of users, or the like, and the display image indicating important words that is newly generated beside the display image generator 16 may be displayed beside the conference information field for the determined conference. Alternatively, a user may select a conference information field with the use of, for example, an input device connected to or included in the word extraction device 100 to display the display image indicating important words that is generated by the display image generator 16 in a display field beside the selected conference information field.

[Display Equipment 60]

The display equipment 60 is a display device, a projector, or the like, and displays a display image indicating important words in response to an instruction from the display image generator 16 included in the controller 10.

[Method of Controlling the Word Extraction Device 100]

Figure 2:
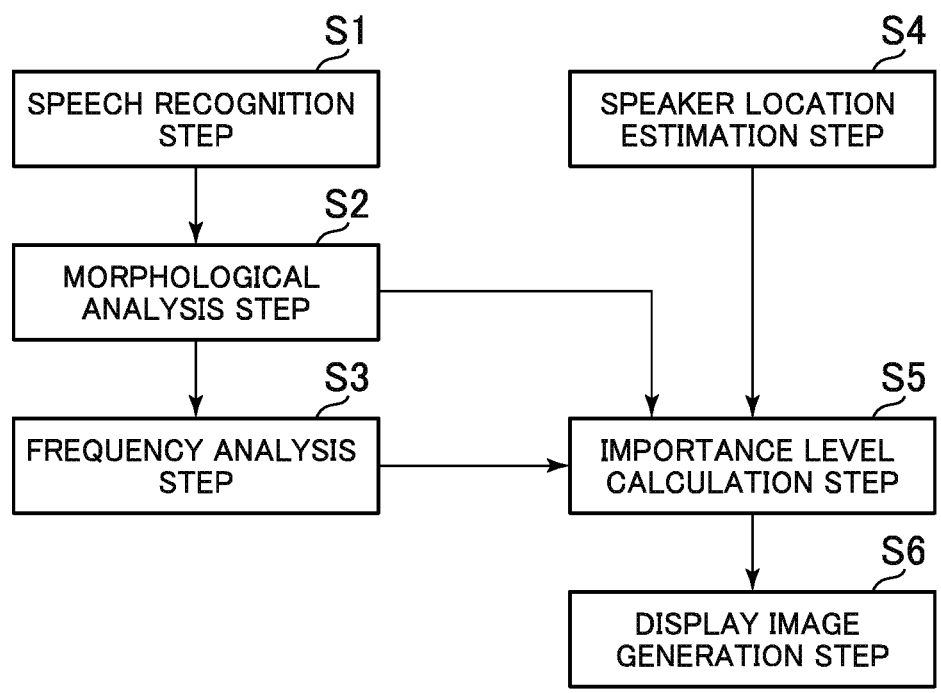
FIG. 2 is a flow chart for illustrating a method of controlling the word extraction device according to the first embodiment.

A specific method of controlling the word extraction device 100 according to the first embodiment is described next with reference to FIG. 2. FIG. 2 is a flow chart for illustrating the method of controlling the word extraction device 100 in the first embodiment.

[Speech Recognition Step S1]

In the speech recognition step S1, the speech recognizer 11 included in the word extraction device 100 receives the speech information transmitted from the sound pickup equipment 30, and converts the speech information into text data in a text format or other formats.

Figure 3:
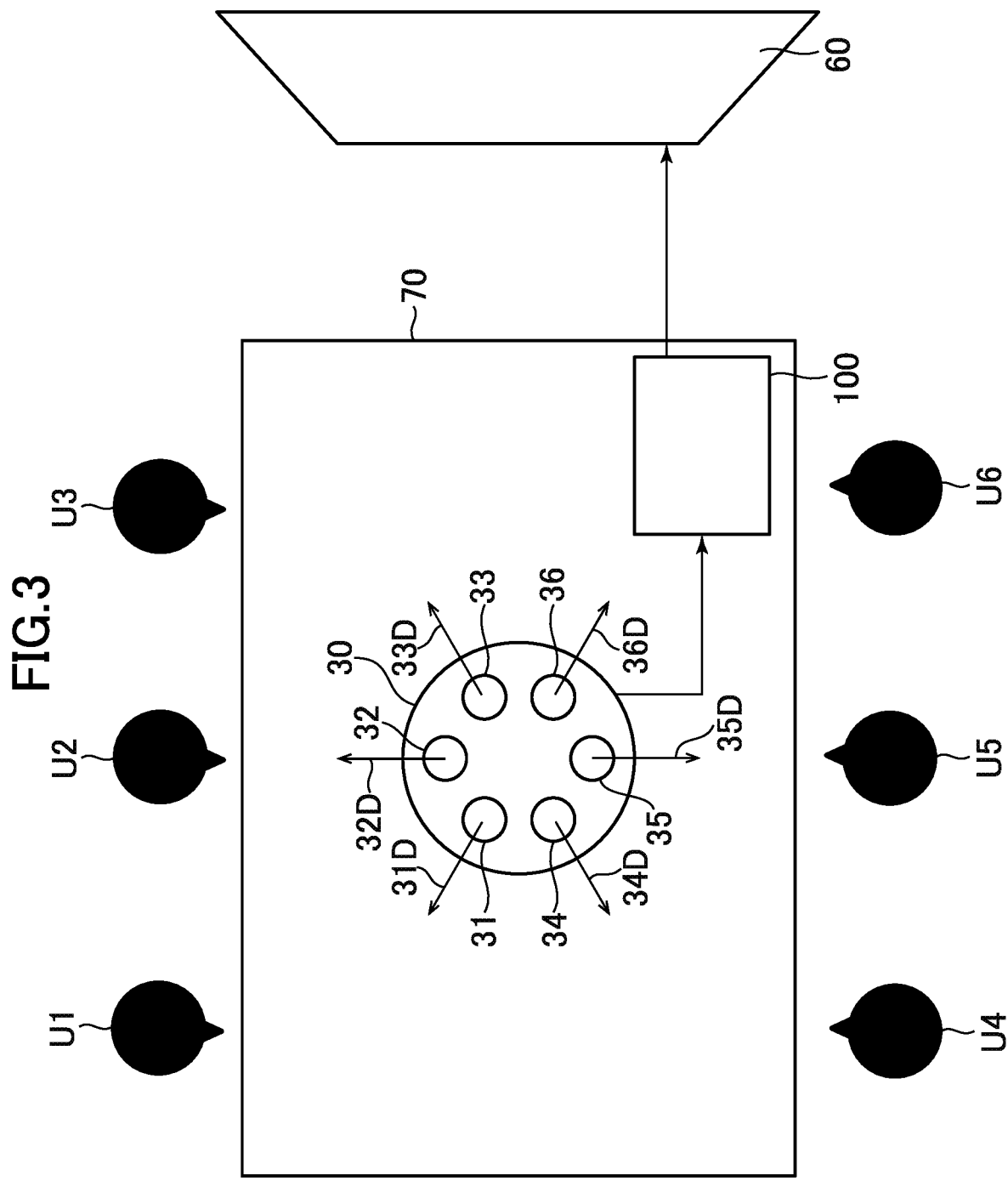
FIG. 3 is a schematic top view for illustrating a scene of a conference that uses the word extraction device according to the first embodiment.

In the first embodiment, as illustrated in FIG. 3, which is a schematic top view for illustrating a scene of a conference that uses the word extraction device 100, a table 70 is placed at the center of a conference room and the sound pickup equipment 30 is placed at the center of a top surface of the table 70. The sound pickup equipment 30 in the first embodiment includes a first directional microphone 31, which has the highest sensitivity in a direction 31D, a second directional microphone 32, which has the highest sensitivity in a direction 32D, a third directional microphone 33, which has the highest sensitivity in a direction 33D, a fourth directional microphone 34, which has the highest sensitivity in a direction 34D, a fifth directional microphone 35, which has the highest sensitivity in a direction 35D, and a sixth directional microphone 36, which has the highest sensitivity in a direction 36D. The directional microphones are arranged in the sound pickup equipment 30 to vary the highest sensitivity direction of each directional microphone by 60 degrees. A first user U1, a second user U2, a third user U3, a fourth user U4, a fifth user U5, and a sixth user U6 are seated around the table 70.

When the conference is started and the users make utterances, speeches uttered by the users are picked up by the first directional microphone 31, the second directional microphone 32, the third directional microphone 33, the fourth directional microphone 34, the fifth directional microphone 35, and the sixth directional microphone 36 in the sound pickup equipment 30, and speech information about the picked up speeches is transmitted to the word extraction device 100.

The transmission of the speech information from the sound pickup equipment 30 to the word extraction device 100 may be wireless transmission or wired transmission. The transmission of the speech information from the sound pickup equipment 30 to the word extraction device 100 may also be direct transmission or indirect transmission via a server or the like. In the first embodiment, the sound pickup equipment 30 transmits the speech information directly to the word extraction device 100 by wireless communication.

In the speech recognition step S1, the speech recognizer 11 included in the word extraction device 100 converts the speech information transmitted from the sound pickup equipment 30 into text data in a text format or other formats, and transmits the text data to the morphological analyzer 12.

[Morphological Analysis Step S2]

In the morphological analysis step S2, the morphological analyzer 12 included in the word extraction device 100 breaks the text data received from the speech recognizer 11 into a plurality of morphemes and identifies the word class and the like of each morpheme based on information stored in the grammar database 41 and the word class database 43, which are included in the storage 40 illustrated in FIG. 1. The morphological analyzer 12 uses the results of identifying the word classes and the like of the morphemes to convert the text data into a string of words containing a plurality of words, and transmits the string of words to the frequency analyzer 13 and the importance level calculator 15.

Words in the string of words are aligned in the order of how much time has elapsed since the start of the conference, and it can accordingly be said that the string of words include time information.

[Frequency Analysis Step S3]

In the frequency analysis step S3, the frequency analyzer 13 included in the word extraction device 100 analyzes the string of words received from the morphological analyzer 12, and calculates an appearance frequency for each of the words. That is, the frequency analyzer 13 calculates, for each word, how many times the word is included in utterances of users in a conference. The frequency analyzer 13 transmits appearance frequency of each word to the importance level calculator 15.

The first embodiment deals with an example in which, during the conference, a word "flat cable" has been uttered 100 times in total, a word "FFC" has been uttered 30 times in total, a word "microphone" has been uttered 80 times in total, and a word "mic" has been uttered 40 times in total.

The frequency analyzer 13 in the first embodiment uses the synonym database 44 included in the storage 40 to identify a word and the word's synonym as the same, and calculates the sum of the appearance frequency of the word and the appearance frequency of the synonym as the word's appearance frequency.

The synonym database 44 in the first embodiment contains information about synonyms of a specific word and, for example, as illustrated in FIG. 9, indicates the degree of similarity of a synonym of a specific word in percentage, from 0% to 100%. A synonym whose degree of similarity is 100% is to be identified with the specific word.

The frequency analyzer 13 accordingly identifies "flat cable" and "FFC", which is a synonym of "flat cable", as the same word, thereby determining that words belonging to a "flat cable group" have been uttered 130 times. The frequency analyzer 13 also identifies "microphone" and "mic", which is a synonym of "microphone", as the same word, thereby determining that words belonging to a "microphone group" have been uttered 120 times.

This method prevents a situation in which the appearance frequencies of a plurality of words used in practically the same meaning are calculated separately. The method consequently reduces the possibility of calculating the importance level of a word that has a plurality of synonyms low despite the word being an important word.

In the first embodiment, an example is given in which the appearance frequency of the synonym is added to the appearance frequency of the specific word, and the sum is regarded as the appearance frequency of a specific word group. The appearance frequency of a synonym whose degree of similarity to the specific word is not 100% may be added as well in the calculation of the appearance frequency of the specific word group. Alternatively, a value that is the product of the appearance frequency of a synonym by the degree of similarity may be added in the calculation of the appearance frequency of the specific word group. For example, when a word "card cable" has been uttered 10 times, 10 may be added to the appearance frequency of "flat cable group". Alternatively, 9 as a value that is obtained by multiplying 10, which is the appearance frequency of "card cable", by 90%, which is the degree of similarity to "flat cable", may be added to the appearance frequency of the "flat cable group".

In the first embodiment, the frequency analyzer 13 thus transmits, to the importance level calculator 15, information indicating that words belonging to the "flat cable group", which is a group of words including synonyms, have been uttered 130 times, information indicating that words belonging to the "microphone group", which is a group of words including synonyms, have been uttered 120 times, and information indicating, for each word uttered during the conference, the number of times the word has been uttered.

[Speaker Location Estimation Step S4]

The speaker location estimation step S4 may be executed in parallel to the speech recognition step S1 described above. In the speaker location estimation step S4, the speaker location estimator 14 included in the word extraction device 100 estimates, for each user, the utterance location of the user based on the user's speech information received from the sound pickup equipment 30.

In the first embodiment, the sound pickup equipment 30 includes the first directional microphone 31, the second directional microphone 32, the third directional microphone 33, the fourth directional microphone 34, the fifth directional microphone 35, and the sixth directional microphone 36, which are arranged to vary the highest sensitivity direction of each of the six directional microphones by 60 degrees as described above with reference to FIG. 3, and the speaker location estimator 14 receives the speech information from the six directional microphones.

After receiving the speech information from the six directional microphones, the speaker location estimator 14 records the speech information from the six directional microphones as a six-dimensional vector, and detects the volume ratio of the speeches reaching the six directional microphones.

In the case of a speech uttered by the second user U2, for example, the first directional microphone 31, the second directional microphone 32, and the third directional microphone 33 are capable of receiving the speech of the second user U2 and converting the speech into an electric signal. The fourth directional microphone 34, the fifth directional microphone 35, and the six directional microphone 36, on the other hand, may receive the speech of the second user U2 but convert the speech only into an electric signal of a relatively small value. That is, the speech of the second user U2 is uttered from behind the fourth directional microphone 34, the fifth directional microphone 35, and the six directional microphone 36, and accordingly separates into the indirect sound, which enters from the hole or groove provided behind the diaphragm, and the direct sound, which reaches the front side of the diaphragm. The indirect sound and the direct sound are mostly canceled by each other, with the result that the electric signal converted from the speech of the second user U2 by the fourth directional microphone 34, the fifth directional microphone 35, and the six directional microphone 36 has a relatively small value. A three-dimensional vector that is related to the fourth directional microphone 34, the fifth directional microphone 35, and the six directional microphone 36 in the six-dimensional vector described above accordingly has a relatively small value, whereas a three-dimensional vector that is related to the first directional microphone 31, the second directional microphone 32, and the third directional microphone 33 is converted into and output as an electric signal having a value larger than output values of the fourth directional microphone 34, the fifth directional microphone 35, and the six directional microphone 36.

The second user U2 is located in a high sensitivity direction of the second directional microphone 32, and the speech uttered by the second user U2 is accordingly received at the highest level by the second directional microphone 32 and in a slightly attenuated state by the first directional microphone 31 and the third directional microphone 33. In the three-dimensional vector taken out as electric signals, an electric signal related to the second directional microphone 32 accordingly has the largest output value, and an electric signal related to the first directional microphone 31 and an electric signal related to the third directional microphone 33 are output in a slightly attenuated state. The speaker location estimator 14 detects the volume ratio of the output electric signals, thereby recognizing that the second user U2 is located in a direction close to the highest sensitivity direction 32D of the second directional microphone 32.

When the conversation ends, the speaker location estimator 14 performs clustering with the use of K-means or other methods to estimate the utterance locations of the first user U1, the second user U2, the third user U3, the fourth user U4, the fifth user U5, and the sixth user U6, and transmits the location information to the importance level calculator 15.

The speaker location estimator 14 in the first embodiment further adds time information to the location information, thereby enabling the importance level calculator 15, which is described later, to associate each word with the location information relevant to the word.

[Importance Level Calculation Step S5]

In the importance level calculation step S5, for each word, the importance level of the word is calculated with the use of the word's appearance frequency information transmitted from the frequency analyzer 13, approving words, which are included in the string of words transmitted from the morphological analyzer 12, and the location information transmitted from the speaker location estimator 14. A more specific description is given below on how the importance level is calculated for each word by the importance level calculator 15.

The importance level calculator 15 first uses the appearance frequency information received for each word from the frequency analyzer 13 to calculate the importance level of the word. A word having a higher appearance frequency is more likely to be important, and a calculation method that gives a high importance level to a word high in appearance frequency is accordingly employed. In the first embodiment, a method in which the appearance count itself of a word is calculated as the word's importance level is employed, for example.

In the first embodiment, the importance level of the "flat cable group", which is a group of words including synonyms, is calculated as 130 points from the appearance frequency information indicating that words belonging to the "flat cable group" have been uttered 130 times, and the importance level of the "microphone group", which is a group of words including synonyms, is calculated as 120 points from the appearance frequency information indicating that words belonging to the "microphone group" have been uttered 120 times.

The importance level calculator 15 subsequently extracts, from the string of words received from the morphological analyzer 12, an approving word and an important word related to the approving word. The importance level calculator 15 refers to the keyword database 45 in the storage 40 to search the string of words transmitted from the morphological analyzer 12 for an approving word. When finding an approving word, the importance level calculator 15 extracts a word to be weighted, based on the timing of utterance of the approving word and the timing of utterance of each of the plurality words included in the string of words, and obtains the word-to-be-weighted information. The importance level calculator 15 weights the importance level of the word to be weighted, based on the appearance count of the word and the word-to-be-weighted information. For example, a word uttered within a predetermined period of time that immediately precedes the time of utterance of the approving word is extracted as a word to be weighted, and the importance level of the extracted word is weighted by multiplying the appearance count of the extracted word by a predetermined coefficient. A method in which a word that is one of a predetermined number of words uttered before the time of utterance of the approving word is extracted as a word to be weighted may be employed.

The importance level calculator 15 in the first embodiment also calculates the number of users who have uttered the approving words described above with the use of the location information received from the speaker location estimator 14. In the calculation of the importance level of a word uttered a predetermined length of time prior to the time of utterance of the approving word, as illustrated in FIG. 4, which is a table for showing the relation between an approving word utterer count and a weighting coefficient, a value dependent on the number of users who have uttered the approving word is determined as the value of a coefficient by which the appearance count of the word is to be multiplied.

The first embodiment deals with an example in which an approving word has been uttered by two users, the first user U1 and the second user U2, within 10 seconds, which is the predetermined length of time, from the time of utterance of a word belonging to the "flat cable group". The importance level calculator 15 follows rules defined in FIG. 4, which is a reference table for weighting coefficients, to multiply the calculated score, 130 points, by a weighting coefficient. Because the approving word has been uttered by two users, the first user U1 and the second user U2, in this example, the importance level calculator 15 determines that the weighting coefficient to be used is 1.7 based on the reference table of FIG. 4. The importance level calculator 15 then multiplies 130 points calculated from the appearance count by the determined weighting coefficient, 1.7, thus calculating the importance level of the "flat cable group" as 221 points.

The first embodiment also adopts a configuration in which the importance level is weighted more heavily in the importance level calculation of a word uttered a predetermined length of time prior to the utterance of an approving word from a specific direction. For instance, when the sixth user U6 is located at the seating place of a person in charge of an organization, the appearance count is multiplied by a higher weighting coefficient in the importance level calculation of a word uttered a predetermined length of time prior to the time of utterance of an approving word by the sixth user U6.

The first embodiment deals with an example in which an approving word has been uttered by two users, the third user U3 and the sixth user U6, within 10 seconds, which is the predetermined length of time, from the time of utterance of a word belonging to the "microphone group". The importance level calculator 15 in this case follows rules defined in FIG. 4 and adds "1" written in an "including the sixth user" field to 1.7, which is the weighting coefficient used when the approving word utterer count is two, to calculate the importance level of the "microphone group" with 2.7 as the weighting coefficient. The importance level calculator 15 accordingly multiplies 120 points calculated from the appearance count by a weighting coefficient of 2.7, thus calculating the importance level of the "microphone group" as 324 points.

The importance level calculator 15 in the first embodiment extracts a "word high in the rate of contribution to the improvement of the conference's atmosphere" from the string of words received from the morphological analyzer 12 to further weight the extracted word. Specifically, the importance level calculator 15 calculates the appearance frequency of an approving word per unit time in the conference from the string of words. The importance level calculator 15 then extracts a point in time at which the appearance frequency of the approving word has increased, and weights the importance level of a word that has been uttered a predetermined length of time prior to the extracted time point.

Figure 5:
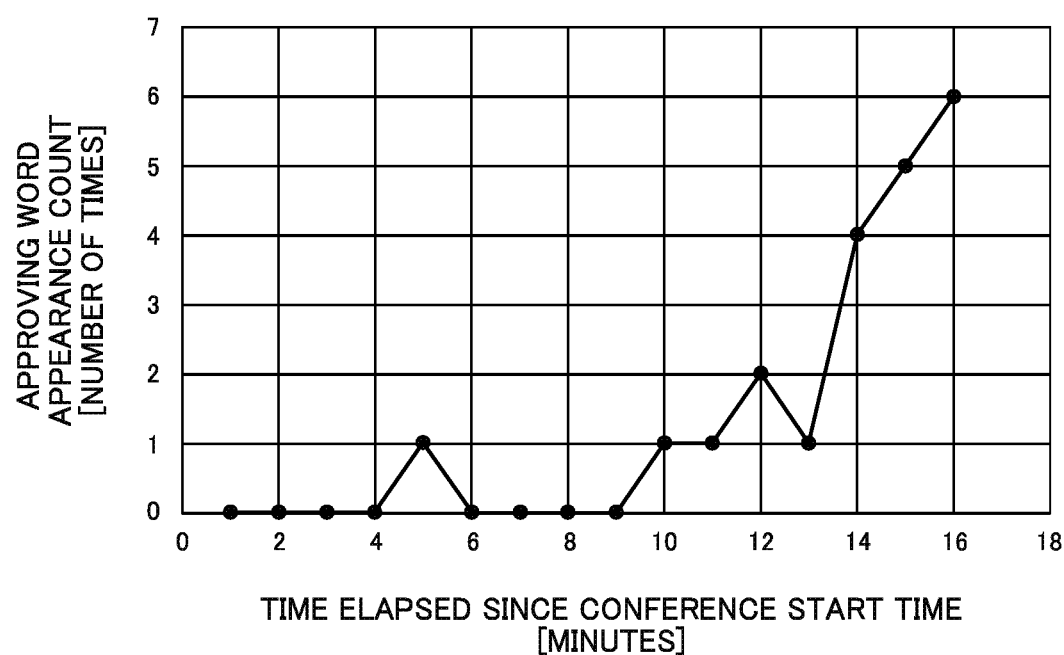
FIG. 5 is a graph for showing an approving word appearance count in relation to a time elapsed since a conference start time in the word extraction device according to the first embodiment.

FIG. 5 is a graph for showing an approving word appearance count in relation to the time elapsed since a conference start time. As shown in FIG. 5, the approving word appearance count starts to increase at 9 minutes past the conference start time. The importance level is accordingly weighted for words uttered in a 30-second period, which is the predetermined length of time, immediately prior to the time point that is 9 minutes past the conference start time, i.e., words uttered in a period that begins at the time point 8 minutes and 30 seconds past the conference start time and that ends at the time point 9 minutes past the conference start time.

It is assumed in the first embodiment that "microphone" has been uttered in this period between the time point 8 minutes and 30 seconds past the conference start time and the time point 9 minutes past the conference start time. The importance level calculator 15 therefore determines "microphone" as a "word high in the rate of contribution to the improvement of the conference's atmosphere", and adds an additional weighting coefficient of 1.5 to 2.7, which is the weighting coefficient described above, to calculate the weighting coefficient to be used as 4.2. The importance level calculator 15 accordingly multiplies 120 points calculated from the appearance count by a weighting coefficient of 4.2, thus calculating the importance level of the "microphone group" as 504 points.

The importance level calculator 15 calculates the importance levels of words uttered in the conference by the method described above, and transmits a plurality of words having high importance levels and the words' importance levels to the display image generator 16. In the first embodiment, top ten important words including the "flat cable group" and the "microphone group" and the importance levels of the important words are transmitted to the display image generator 16. The importance level calculator 15 may transmit, to the display image generator 16, a list that contains every word uttered in the conference and the importance level of the uttered word. In the first embodiment, however, only top ten important words and the words' importance levels are transmitted to the display image generator 16 in order to keep the amount of data communication small.

[Display Image Generation Step S6]

In the display image generation step S6, the display image generator 16 included in the word extraction device 100 uses the plurality of words having high importance levels and received from the importance level calculator 15 to generate a display image indicating important words as an image to be displayed on the display equipment 60.

Figure 6:
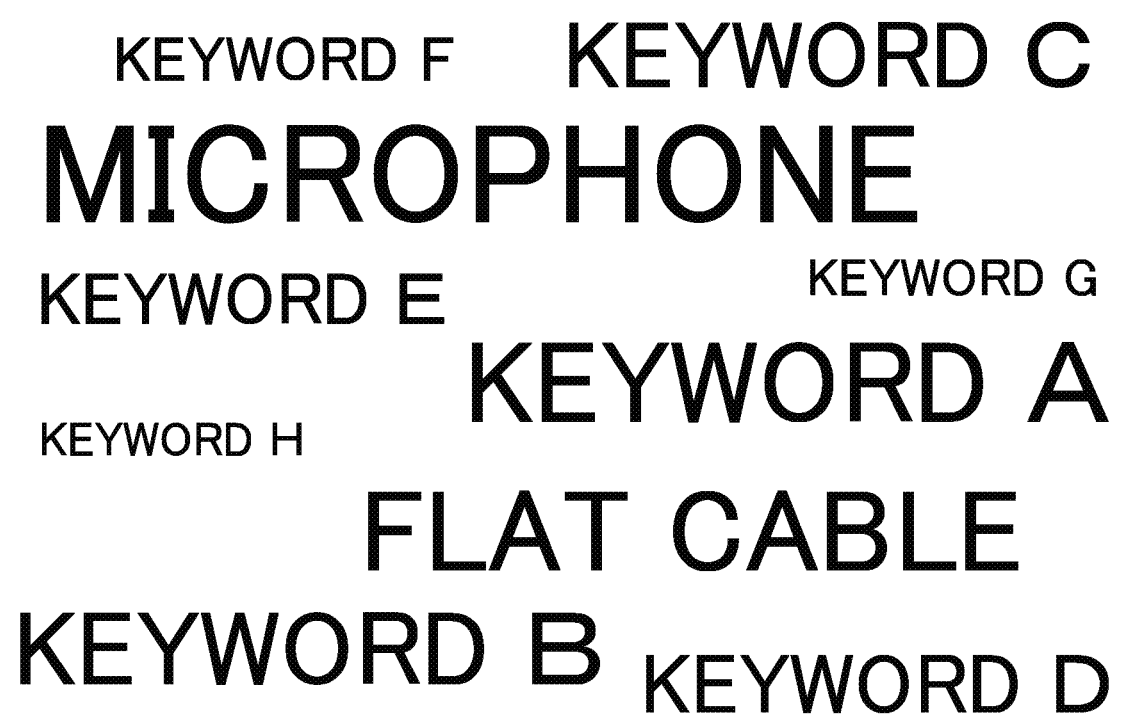
FIG. 6 is a conceptual diagram for illustrating a display image in which important word generated by the word extraction device according to the first embodiment are displayed.

The display image generator 16 in the first embodiment generates a display image indicating important words as the one illustrated in FIG. 6. In the display image indicating important words that is illustrated in FIG. 6, "microphone" and "flat cable" whose importance levels are particularly high among the plurality of selected words, are displayed in large fonts and in a red color, which is an eye-catching display color. Words of high importance levels can be made more conspicuous by designing the display image indicating important words in this manner. The display image indicating important words also displays a keyword A to a keyword H, which are the third highest to tenth highest important words, in font sizes and display colors that are selected based on the words' importance levels.

The display image generator 16 generates a display image indicating important words as the one illustrated in FIG. 6, and transmits data about the generated display image indicating important words to the display equipment 60, to thereby display the display image indicating important words on the display equipment 60. In the first embodiment, the display equipment 60 displays the display image indicating important words in a display area that is provided in advance beside an information field for one of the conferences in which the conference's agenda, organizer, date/time, location, and the like are written in, for example as illustrated in FIG. 7, a scheduler used for booking status checking, registration, and the like of a plurality of conferences in an organization.

The conference information field beside which the display image indicating important words is to be displayed out of conference information fields for the plurality of conferences may be determined by the controller 10. For example, the controller 10 determines which conference is currently being held from the date/time and location of the conference, login statuses of users, or the like, and the display image indicating important words that is newly generated by the display image generator 16 is displayed beside the conference information field for the determined conference. Alternatively, a user may select a conference information field with the use of, for example, an input device connected to or included in the word extraction device 100 to display the display image indicating important words that is generated by the display image generator 16 in a display field beside the selected conference information field.

Assume that Mr. Yamada who is an organizer of a conference "Codec Brainstorming" illustrated in FIG. 7 holds the conference while logging in on a personal computer that is connected to a network in an organization, and the personal computer receives a display image indicating important words from a communicator that is included in the word extraction device 100. The personal computer in this case may determine that the currently held conference is the "Codec Brainstorming" conference, based on the conference time, the conference location, identification information that is assigned to the personal computer operated by Mr. Yamada, and other types of information, and display the received display image indicating important words in a field beside the conference information field of the "Codec Brainstorming" conference in a scheduler illustrated in FIG. 7.

Alternatively, Mr. Yamada who is the organizer of the conference may use a keyboard, mouse, or the like of the personal computer to display the display image indicating important words that has been generated by the display image generator 16 beside the conference information field of the "Codec Brainstorming" conference, by copy & paste or other methods.

[Related Conference Extraction System 200]

A related conference extraction system 200 is described below with reference to the drawings.

Figure 8:
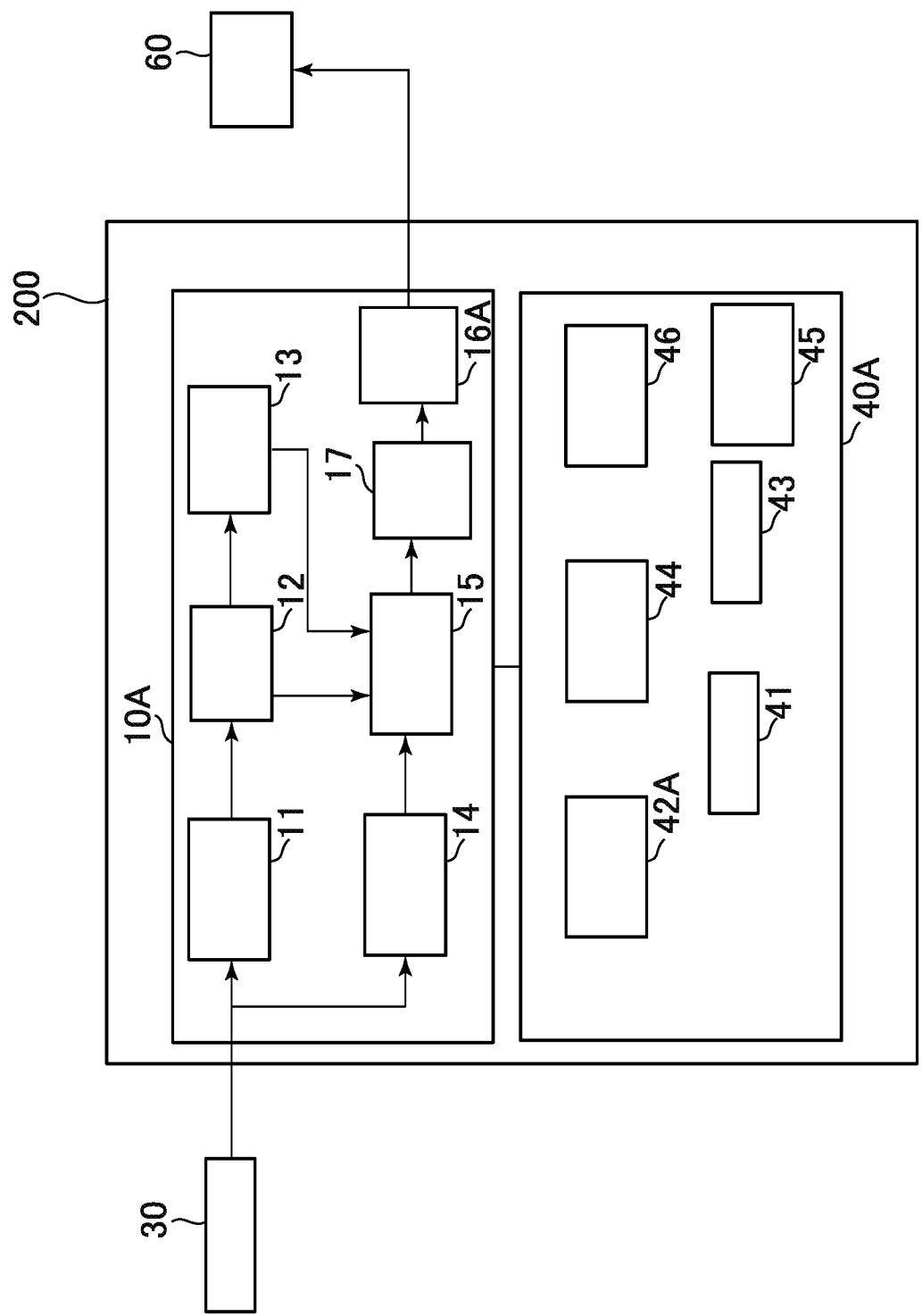
FIG. 8 is a block diagram of a related conference extraction system according to the first embodiment.

FIG. 8 is a block diagram of the related conference extraction system 200 according to the first embodiment. As illustrated in FIG. 8, the related conference extraction system 200 includes a configuration that is basically the same as the word extraction device 100, and the same components are denoted by the same reference symbols in order to omit descriptions on the components.

Differences of the related conference extraction system 200 from the word extraction device 100 include, for example, that a controller 10A includes a related conference extractor 17 between the importance level calculator 15 and a display image generator 16A, that a storage 40A includes a related conference information database 46, that the display image generator 16A generates a display image indicating a related conference, and that the controller 10A is a computer executing, among others, the speech recognition step S1, the morphological analysis step S2, the frequency analysis step S3, the speaker location estimation step S4, the importance level calculation step S5, a related conference extraction step S7, and a display image generation step S6A, which are described later, as programmed by a program 42A stored in the storage 40A. The related conference extraction system 200 and the word extraction device 100 in the present disclosure basically share many components, and may be configured in an integrated manner. When the related conference extraction system 200 and the word extraction device 100 are configured in an integrated manner, the display image generator 16A generates both the display image indicating a related conference and the display image indicating important words, and transmits data about the display image indicating a related conference and data about the display image indicating important words to the display equipment 60.

[Related Conference Information Database 46]

The related conference information database 46 includes conference information about conferences held in an organization. The conference information includes, for example, the agenda, organizer, date/time, location, and the like of each conference held in the past and, in addition, a word determined as highly important in the conference and information about the word's importance level.

[Related Conference Extractor 17]

The related conference extractor 17 uses an important word and the word's importance level that are received from the importance level calculator 15 to extract a conference highly related to the currently held conference from the related conference information database 46, which is included in the storage 40A.

As described above, the related conference information database 46 includes, for each of a plurality of conferences held in the past, a word determined as highly important in the conference and information about the word's importance level. The related conference extractor 17 searches pieces of conference information about the plurality of conferences for a conference whose important word matches with an important word in the currently held conference, or with a synonym of the important word, and determines the found conference as a conference highly related to the currently held conference.

The related conference extractor 17 may use the synonym database 44 illustrated in FIG. 9 when determining, for each of the plurality of conferences held in the past, the degree of match between an important word in the currently held conference and an important word in the past conference. An example is given in which "flat-shaped cable" is determined as an important word in a past conference and "flat cable" is determined as an important word in the currently held conference. In this case, it is figured out from reference to the synonym database 44 illustrated in FIG. 9 that "flat-shaped cable" does not have the same meaning as that of "flat cable" but is a synonym of "flat cable", and that the degree of similarity of "flat-shaped cable" to "flat cable" is 43%. Thus, for example, a value obtained by adding the degree of similarity, 43%, to the importance level of "flat-shaped cable" in the past conference and the importance level of "flat cable" in the currently held conference is calculated as the degree of relatedness between the past conference and the currently held conference.

After extracting a conference that is determined as highly related to the currently held conference from the plurality of conferences held in the past, the related conference extractor 17 transmits, to the display image generator 16A, information about the conference determined as highly related.

[Display Image Generator 16A]

The display image generator 16A in the related conference extraction system 200 uses pieces of conference information received from the related conference extractor 17 as information about a plurality of highly related conferences to generate a display image indicating a related conference to be displayed on the display equipment 60. A display image indicating a related conference is an image in which information about the currently held conference is displayed at the center and information about past conferences highly related to the currently held conference is displayed around the information about the currently held conference. When generating a display image indicating a related conference, the display image generator 16 may make information about a conference that is particularly highly related among the plurality of selected conferences more conspicuous by, for example, displaying the information about the particularly highly related conference in large letters or in a different color.

[Method of Controlling the Related Conference Extraction System 200]

Figure 10:
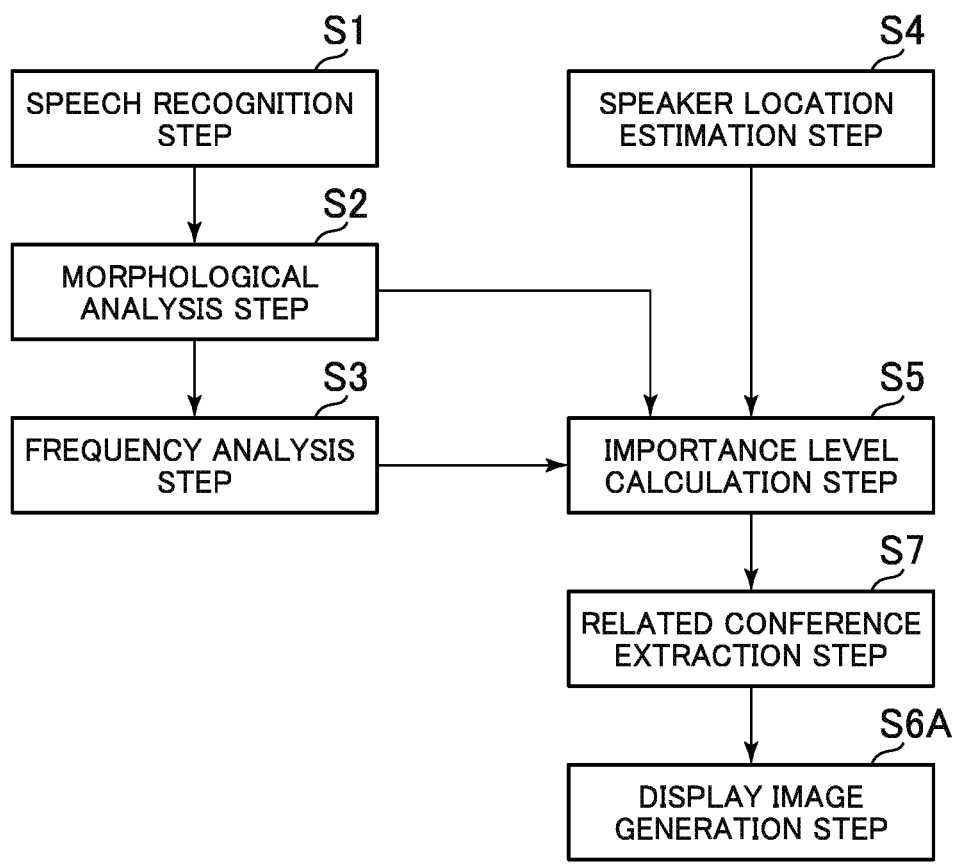
FIG. 10 is a flowchart for illustrating a method of controlling the related conference extraction system according to the first embodiment.

A specific method of controlling the related conference extraction system 200 according to the first embodiment is described next with reference to FIG. 10. FIG. 10 is a flow chart for illustrating the method of controlling the related conference extraction system 200 according to the first embodiment.

The method of controlling the related conference extraction system 200 according to the first embodiment includes the speech recognition step S1, the morphological analysis step S2, the frequency analysis step S3, the speaker location estimation step S4, and the importance level calculation step S5, which are the same as Step S1 to Step S5 in the method of controlling the word extraction device 100 described above. Descriptions on Step S1 to Step S5 are accordingly omitted here.

[Related Conference Extraction Step S7]

In the related conference extraction step S7, the related conference extractor 17 included in the related conference extraction system 200 uses information about an important word and the word's importance level that is received from the importance level calculator 15 to extract a conference highly related to the currently held conference from the related conference information database 46, which is included in the storage 40A.

In the first embodiment, the importance level calculator 15 transmits, as described above, top ten important words including the "microphone group" and the "flat cable group" to the related conference extractor 17 as important words of the currently held conference, along with the importance levels of the ten words. The importance level of the "microphone group" is 504 points and the importance level of the "flat cable group" is 221 points.

The related conference information database 46 in the first embodiment includes pieces of conference information of a plurality of conferences held in the past, for example, "Codec Meeting", "MPS Progress Report", and "Music Player Brainstorming", words determined as highly important in the plurality of conferences, and information about the importance levels of the highly important words.

In "Codec Meeting", which is one of the conferences held in the past, "sound receiving element" is extracted as an important word, and the importance level of "sound receiving element" is 300 points. Another important word extracted in "Codec Meeting" is "flat-shaped cable", and the importance level of "flat-shaped cable" is 200 points.

The related conference extractor 17 in the first embodiment uses the synonym database 44 illustrated in FIG. 9 when determining, for each of the plurality of conferences held in the past, the degree of match between an important word in the currently held conference and an important word in the past conference. In a calculation example, a value obtained by multiplying the importance level of the important word in the currently conference by the importance level of the important word in the past conference and the degree of similarity between the important words is calculated, and the same calculation is performed for every important word in the currently held conference to set the sum of the calculated values as the degree of relatedness between the currently held conference and the past conference.

A specific example is given in which the related conference extractor 17 first multiplies 504 points, which is the importance level of the "microphone group" including "microphone" and "mic" and determined as an important word in the currently held conference, by 300 points, which is the importance level of "sound receiving element" determined as an important word in "Codec Meeting" held in the past, and 100%, which is the degree of similarity of "sound receiving element" to words belonging to the "microphone group". The related conference extractor 17 consequently obtains 302,400 points as the degree of relatedness with respect to the "microphone group". The related conference extractor 17 also multiplies 221 points, which is the importance level of the "flat cable group" including "flat cable" and "FFC" and determined as an important word in the currently held conference, by 200 points, which is the importance level of "flat-shaped cable" determined as an important word in "Codec Meeting" held in the past, and 43%, which is the degree of similarity of "flat-shaped cable" towards belonging to the "flat cable group". The related conference extractor 17 consequently obtains 19,006 points as the degree of relatedness with respect to the "flat cable group". In this example, no important words in "Codec Meeting", which is a conference held in the past, match "keyword A" to "keyword H", which are determined as important words in the currently held conference, "Codec Brainstorming", or synonyms of "keyword A" to "keyword H". From those results, the related conference extractor 17 adds together 302,400 points, which is the degree of relatedness with respect to the "microphone group", and 19,006 points, which is the degree of relatedness with respect to the "flat cable group", to determine that the degree of relatedness between "Codec Brainstorming" and "Codec Meeting" is 321,406 points.

The related conference extractor 17 uses the same method to calculate the degrees of relatedness of "Codec Brainstorming", which is the currently held conference, to "MPS Progress Report" and "Music Player Brainstorming", which are conferences held in the past. In the first embodiment, the degree of relatedness between "Codec Brainstorming" and "MPS Progress Report" is 200,000 points, and the degree of relatedness between "Codec Brainstorming" and "Music Player Brainstorming" is 100,000 points The calculation described above is merely an example, and where multiplication and addition are used may be changed suitably.

After extracting a conference that is determined as highly related to the currently held conference from the plurality of conferences held in the past, the related conference extractor 17 transmits, to the display image generator 16A, information about the conference determined as highly related.

[Display Image Generation Step S6A]

In the display image generation step S6A, the display image generator 16A included in the related conference extraction system 200 uses pieces of conference information received from the related conference extractor 17 as information about a plurality of highly related conferences to generate a display image indicating a related conference to be displayed on the display equipment 60.

Figure 11:
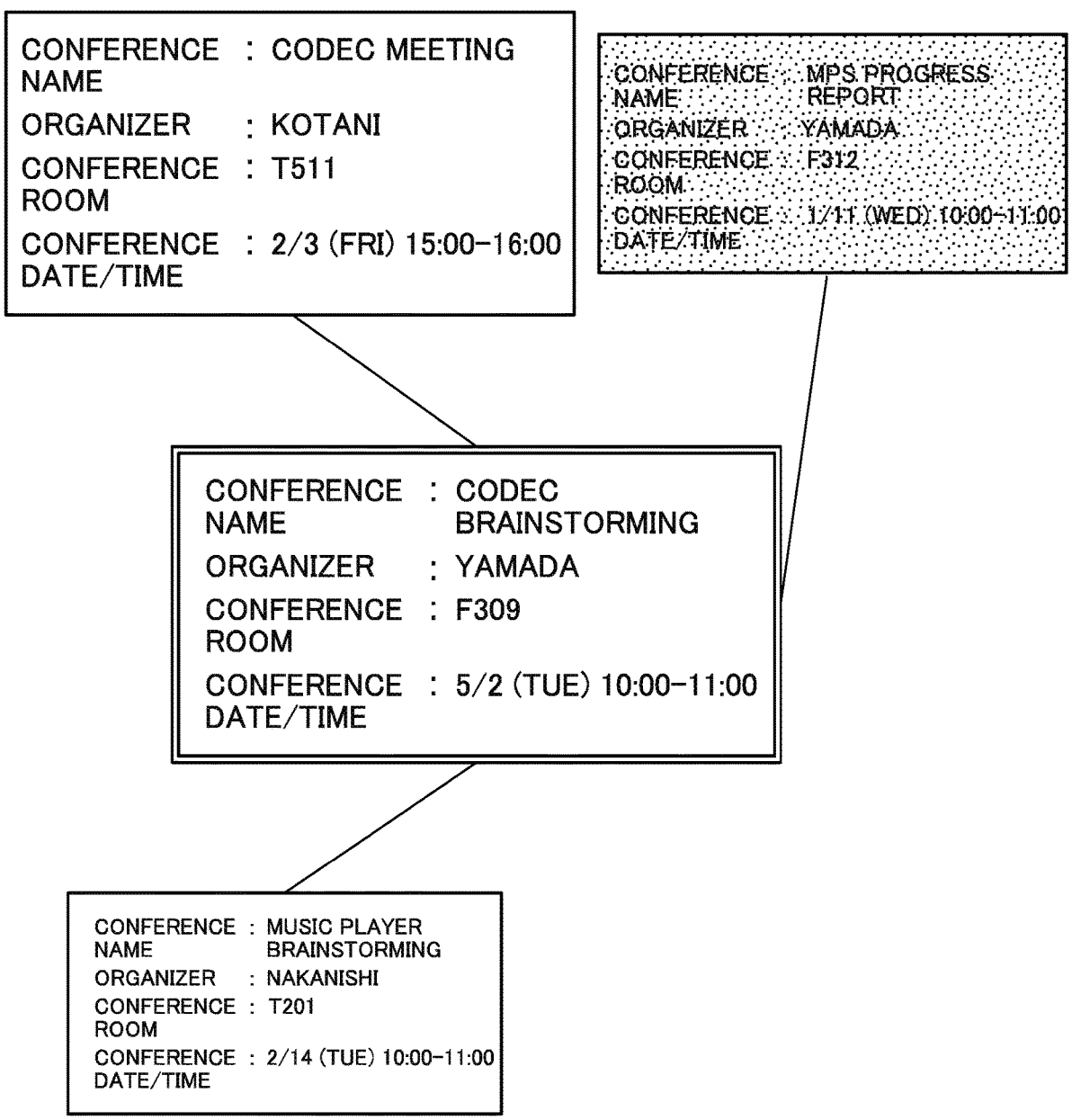
FIG. 11 is a conceptual diagram for illustrating a display image indicating a related conference generated by the related conference extraction system according to the first embodiment is displayed.

As illustrated in FIG. 11, the display image generator 16A in the first embodiment displays information about the currently held conference at the center of the display image indicating a related conference, and displays information about past conferences that are determined as highly related to the currently held conference around the information about the currently held conference. The conference information about the currently held conference may be displayed in a manner different from how other conferences related to the currently held conference are displayed, by, for example, using a bold line to outline the conference information of the currently held conference. This enables a user to easily pick out the conference information about the currently held conference from among pieces of conference information of a plurality of conferences. In the first embodiment, the font size and the outline thickness that are used to display conference information about a conference may be varied depending on the degree of relatedness of the conference to the currently held conference as in the case of "Codec Meeting", which is determined as particularly highly related to the currently held conference out of the plurality of related conferences and displayed with the use of a large font and a thick outline. This display method enables a user to easily find out, for each of the plurality of related conferences, how high the degree of relatedness of the conference to the currently held conference is.

With the control method described above, the related conference extraction system 200 is controlled to extract past conferences highly related to the currently held conference, and to display, on the display equipment 60, a display image indicating a related conference that includes conference information of the past conferences determined as highly related to the currently held conference. The control method thus enables a user to find out a past conference related to the currently held conference and participants of the past conference. The resultant effect is that information sharing is facilitated between the user and the participants of the past conference determined as highly related to the currently held conference.

When importance is to be given to the effect of facilitating information sharing between the user and members participating in a conference different from the currently held conference, a related conference that shares the same organizer or the same participant group with the currently held conference out of a plurality of related conferences held in the past is desirably omitted from the display image indicating a related conference, or displayed in a different manner that makes the related conference inconspicuous. In the example illustrated in FIG. 11, the organizer of the currently held conference is Mr. Yamada, and the organizer of "MPS Progress Report", which is displayed as a past related conference, is also Mr. Yamada. In this case, "MPS Progress Report" is displayed in an inconspicuous manner different from how other related conferences are displayed, by, for example, using gray as the background color of the displayed "MPS Progress Report". This display method makes information about members participating in other conferences, which is information desired by the user, stand out, with the result that information sharing between the user and members who have been participants of related conferences held in the past is facilitated even more.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A word extraction device comprising:
   at least one memory device storing instructions; and
   at least one processor that implements the instructions to execute a plurality of tasks, including:
   a speech recognizing task that:
      receives speech information from a sound pickup equipment including a plurality of directional microphones arranged spaced apart for picking up speech information from a plurality of speakers; and
      converts the received speech information from the plurality of directional microphones and convert into text data;
   a text converting task that converts the text data into a string of words including a plurality of words;
   a frequency calculating task that calculates appearance frequencies of the plurality of words;
   a keyword extracting task that extracts a keyword included in a keyword database from the plurality of words and a word to be weighted from the plurality of words, the extracted word to be weighted being uttered within a predetermined period of time immediately before timing of utterance of the extracted keyword;
   a speaker location estimating task that estimates, based on the speech information, a speech utterance location of each speaker by:
      detecting a volume ratio of sounds reaching the plurality of directional microphones; and
      clustering on the volume ratio for a conversation of a fixed length of time;
   a location information generating task that generates location information about the estimated location of each speaker who uttered the extracted keyword;
   a speaker number estimating task that estimates a number of speakers who uttered the extracted keyword based on the location information;
   a word-to-be weighted information obtaining task that obtains word-to-be-weighted information, which is weighting coefficient that depends on the number of speakers who uttered the keyword, about the extracted word to be weighted; and
   an extracted word importance level calculating task that calculates an importance level of the extracted word to be weighted based on the appearance frequency thereof and the obtained word-to-be-weighted information, which depends on the number of speakers who uttered the keyword and is usable for identifying a related conference from among a plurality of previously held conferences.

2. The word extraction device according to claim 1, wherein the plurality of tasks include a speaker determination task that determines, based on the generated location information, whether a speaker, among the plurality of speakers, has uttered the extracted keyword from a specific direction.

3. The word extraction device according to claim 2, wherein the plurality of tasks include a weighting coefficient determining task that determines, based on whether a speaker has uttered the extracted keyword from the specific direction, the weighting coefficient to be used in calculating the importance level of the extracted word to be weighted.

4. The word extraction device according to claim 1, wherein the plurality of tasks include an associating task that associates the string of words with the generated location information by adding time information to the generated location information.

5. The word extraction device according to claim 1, wherein:
   the plurality of tasks include:
      an extracted keyword frequency calculating task that calculates, from the string of words, an appearance frequency of the extracted keyword per unit time; and
      a time extracting task that extracts a point in time where the appearance frequency of the extracted keyword has started to increase; and
   the extracted word importance level calculating task calculates the importance level of the extracted word to be weighted uttered immediately before the extracted point in time using a predetermined weighting coefficient.

6. The word extraction device according to claim 1, further comprising:
   a synonym database, which includes information about a synonym of a specific word,
   wherein the plurality of tasks include a specific word frequency calculating task that calculates an appearance frequency of the specific word included in the plurality of words using the information about the synonym included in the synonym database.

7. The word extraction device according to claim 6, wherein the plurality of tasks include an adding task that adds an appearance frequency of the synonym to the appearance frequency of the specific word.

8. The word extraction device according to claim 1, wherein the plurality of tasks include an image generating task that generates, based on the importance level of the extracted word to be weighted, a display image indicating an important word.

9. The word extraction device according to claim 8, wherein the plurality of tasks include a displaying information determining task that determines, based on the importance level of the extracted word to be weighted, font sizes and display colors of the words included in the display image indicating the important word.

10. The word extraction device according to claim 1, further comprising:
a grammar database and a word class database,
wherein the plurality of tasks include a text dividing task that divides the text data into a plurality of morphemes and identify a word class of each of the plurality of morphemes, based on the grammar database and the word class database, to convert the text data into the string of words.

11. The word extraction device according to claim 1, wherein the extracted keyword corresponds to an approving word that signifies an approval of the extracted word to be weighted uttered immediately before the extracted keyword.

12. A related conference extraction system comprising:
a sound pickup equipment including a plurality of directional microphones arranged spaced apart for picking up speech information from a plurality of speakers;
at least one memory device storing instructions; and
at least one processor that implements the instructions to execute a plurality of tasks, including:
a speech recognizing task that:
receives speech information from the plurality of directional microphones of the sound pickup equipment; and
converts the received speech information from the plurality of directional microphones and convert into text data;
a text converting task that converts the text data into a string of words including a plurality of words;
a frequency calculating task that calculates appearance frequencies of the plurality of words;
a keyword extracting task that extracts a keyword included in a keyword database from the plurality of words and a word to be weighted from the plurality of words, the extracted word to be weighted being uttered within a predetermined period of time immediately before timing of utterance of the extracted keyword;
a speaker location estimating task that estimates, based on the speech information, a speech utterance location of each speaker by:
detecting a volume ratio of sounds reaching the plurality of directional microphones; and
clustering on the volume ratio for a conversation of a fixed length of time;
a location information generating task that generates location information about the estimated location of each speaker who uttered the extracted keyword;
a speaker number estimating task that estimates a number of speakers who uttered the extracted keyword based on the location information;
a word-to-be weighted information obtaining task that obtains word-to-be-weighted information, which is a weighting coefficient that depends on the number of speakers who uttered the keyword, about the extracted word to be weighted;
an extracted word importance level calculating task that calculates an importance level of the extracted word to be weighted based on the appearance frequency thereof and the obtained word-to-be-weighted information, which depends on the number of speakers who uttered the keyword; and
a conference information extracting task that extracts, from pieces of conference information of a plurality of past conferences included in a related conference information database, conference information of a related conference, based on the calculated importance level of the extracted word to be weighted.

13. The related conference extraction system according to claim 12, further comprising:
a synonym database, which includes information about a synonym of a specific word,
wherein the conference information extracting task extracts the conference information of the related conference from the pieces of conference information of the plurality of past conferences included in the related conference information database using the information about the synonym included in the synonym database.

14. The related conference extraction system according to claim 13, wherein the plurality of tasks include:
a synonym importance level determining task that determines an importance level of a synonym of the specific word as important in the conference information of the related conference using an importance level of the specific word included in the plurality of words; and
a similarity determining task that determines a degree of similarity between the specific word and the synonym, in a case where the conference information of the related conference is extracted from the pieces of conference information of the plurality of past conferences included in the related conference information database.

15. The related conference extraction system according to claim 12, wherein the plurality of tasks include image generating task that generates a display image indicating the related conference, based on a degree of relatedness of a current conference to the related conference.

16. The related conference extraction system according to claim 15, wherein the image generating task determines, based on the degree of relatedness, a display size of the conference information included in the display image indicating the related conference.

17. The related conference extraction system according to claim 15, wherein the image generating task determines a displaying manner in which the conference information is included in the display image indicating the related conference, with participant information, which is included in the conference information.

18. A word extraction device comprising:
at least one memory storing instructions; and
at least one processor that implements the instructions to execute a plurality of tasks, including:
a speech recognizing task that:
receives speech information from a sound pickup equipment including a plurality of directional microphones arranged spaced apart for picking up speech information from a plurality of speakers; and
converts the received speech information from the plurality of directional microphones and convert into text data;
a text converting task that converts the text data into a string of words including a plurality of words;
a keyword extracting task that extracts a keyword included in a keyword database from the plurality of words and a word to be weighted from the plurality of words, the extracted word to be weighted being uttered within a predetermined period of time immediately before timing of utterance of the extracted keyword;

a speaker location estimating task that estimates, based on the speech information, a speech utterance location of each speaker by:
  detecting a volume ratio of sounds reaching the plurality of directional microphones; and
  clustering on the volume ratio for a conversation of a fixed length of time;
a location information generating task that generates location information about the estimated location of each speaker who uttered the extracted keyword;
a speaker number estimating task that estimates a number of speakers who uttered the extracted keyword based on the location information;
a word-to-be weighted information obtaining task that obtains word-to-be-weighted information, which is a weighting coefficient that depends on the number of speakers who uttered the keyword, about the extracted word to be weighted; and
an extracted word importance level calculating task that calculates an importance level of the extracted word to be weighted based on the obtained word-to-be-weighted information, which depends on the number of speakers who uttered the keyword, for identifying a related conference from among a plurality of previously held conferences.

19. The word extraction device according to claim 18, wherein the plurality of tasks include:
  a frequency calculating task that calculates appearance frequencies of the plurality of words; and
  an importance-levels calculating task that calculates importance levels of the plurality of words based on the calculated appearance frequencies.

20. A word extraction method executable with at least one processor operating with a memory device, the method comprising:
  a speech recognizing step of recognizing speech by:
    receiving speech information from a sound pickup equipment including a plurality of directional microphones arranged spaced apart for picking up speech information from a plurality of speakers; and
    converting the received speech information from the plurality of directional microphones into text data;
  a text converting step of converting the text data into a string of words including a plurality of words;
  a keyword extracting step of extracting a keyword included in a keyword database from the plurality of words and a word to be extracted from the plurality of words, the extracted word to be weighted being uttered within a predetermined period of time immediately before timing of utterance of the extracted keyword;
  a speaker location estimating step of estimating, based on the speech information, a speech utterance location of each speaker by:
    detecting a volume ratio of sounds reaching the plurality of directional microphones; and
    clustering on the volume ratio for a conversation of a fixed length of time;
  a location information generating step of generating location information about the estimated location of each speaker who uttered the extracted keyword;
  a speaker number estimating step of estimating a number of speakers who uttered the extracted keyword based on the location information;
  a word-to-be-weighted information obtaining step of obtaining word-to-be-weighted information, which is a weighting coefficient that depends on the number of speakers who uttered the keyword, about the extracted word to be weighted; and
  an extracted word importance level calculating step of calculating an importance level of the extracted word to be weighted based on the obtained word-to-be-weighted information, which depends on the number of speakers who uttered the keyword, for identifying a related conference from among a plurality of previously held conferences.

21. The word extraction method according to claim 20, further comprising:
  an appearance frequency calculating step of calculating appearance frequencies of the plurality of words; and
  an importance-levels calculating step of calculating importance levels of the plurality of words based on the calculated appearance frequencies.

* * * * *